United States Patent
LaRose, Jr. et al.

(10) Patent No.: US 10,151,229 B2
(45) Date of Patent: Dec. 11, 2018

(54) METHOD FOR CONTROLLING AN EXHAUST GAS TREATMENT SYSTEM

(71) Applicant: GM GLOBAL TECHNOLOGY OPERATIONS LLC, Detroit, MI (US)

(72) Inventors: Thomas LaRose, Jr., Howell, MI (US); Giovanni David, Turin (IT); Jose Marcelino Garcia, Farmington Hils, MI (US)

(*) Notice: Subject to any disclaimer, the term of this patent is extended or adjusted under 35 U.S.C. 154(b) by 80 days.

(21) Appl. No.: 15/361,730

(22) Filed: Nov. 28, 2016

(65) Prior Publication Data

US 2018/0149056 A1    May 31, 2018

(51) Int. Cl.
| | |
|---|---|
| F01N 3/00 | (2006.01) |
| F01N 3/20 | (2006.01) |
| F01N 11/00 | (2006.01) |
| F01N 9/00 | (2006.01) |
| F01N 3/035 | (2006.01) |

(52) U.S. Cl.
CPC ............. *F01N 3/208* (2013.01); *F01N 9/00* (2013.01); *F01N 11/002* (2013.01); *F01N 3/035* (2013.01); *F01N 2560/026* (2013.01); *F01N 2610/02* (2013.01); *F01N 2610/144* (2013.01); *F01N 2900/0402* (2013.01); *F01N 2900/08* (2013.01); *F01N 2900/1402* (2013.01); *F01N 2900/1812* (2013.01); *F01N 2900/1818* (2013.01); *F01N 2900/1821* (2013.01)

(58) Field of Classification Search
USPC .......... 60/274, 277, 286, 295, 297, 301, 303
See application file for complete search history.

(56) References Cited

U.S. PATENT DOCUMENTS

| | | | | |
|---|---|---|---|---|
| 8,161,735 | B2* | 4/2012 | Kitazawa | F01N 3/2066 60/295 |
| 8,453,437 | B2* | 6/2013 | Sugihara | F01N 3/22 60/317 |
| 9,145,817 | B2* | 9/2015 | Ohno | F01N 3/0842 |
| 9,816,416 | B2* | 11/2017 | Furesawa | F01N 3/2013 |
| 2009/0019835 | A1* | 1/2009 | Dingle | F01N 11/00 60/282 |
| 2013/0283771 | A1* | 10/2013 | Nagata | F01N 3/2066 60/282 |
| 2017/0314440 | A1* | 11/2017 | Minezawa | F01N 3/208 |

* cited by examiner

*Primary Examiner* — Binh Q Tran

(57) ABSTRACT

A method for controlling an exhaust gas treatment system is provided. The exhaust gas treatment system includes an exhaust gas stream supplied by an exhaust gas source to a selective catalytic reduction device, and a reductant supply source utilizing a volumetric pump. The exhaust gas source can include an internal combustion engine (ICE), such as a gasoline or diesel ICE. The method for controlling an exhaust gas treatment system includes commanding a reductant dosing quantity, determining a volumetric pump energizing time, determining an energizing time correction, and energizing the pump. The volumetric pump can comprise pump logic, and the volumetric pump energizing time can be determined by the pump logic. The energizing time correction can be determined using a calibration table. The calibration table can prescribe an energizing time correction based on a current pump pressure and the commanded dosing quantity.

19 Claims, 3 Drawing Sheets

METHOD FOR CONTROLLING AN EXHAUST GAS TREATMENT SYSTEM

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons and oxides of nitrogen ($NO_x$) as well as condensed phase materials (liquids and solids) that constitute particulate matter. Reduction of $NO_x$ emissions from an exhaust feed stream containing excess oxygen is a challenge for vehicle manufacturers.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into to ammonia, and absorbed by the SCR device. The ammonia then reduces the $NO_x$ to nitrogen in the presence of the SCR catalyst. Accurate control of reductant delivery to SCR devices remains a challenge.

SUMMARY

According to an aspect of an exemplary embodiment, a method for controlling an exhaust gas treatment system is provided. The exhaust gas treatment system can include an exhaust gas stream supplied by an exhaust gas source to a selective catalytic reduction device, and a reductant supply source utilizing a volumetric pump. Additionally or alternatively, the exhaust gas treatment system includes an exhaust gas stream supplied by an exhaust gas source to a selective catalytic reduction filter device. The exhaust gas source can include an ICE, such as a gasoline or diesel ICE. The method for controlling an exhaust gas treatment system includes commanding a reductant dosing quantity, determining a volumetric pump energizing time, determining an energizing time correction, and energizing the pump. The volumetric pump can comprise pump logic, and the volumetric pump energizing time can be determined by the pump logic. The energizing time correction can be determined using a calibration table. The calibration table can prescribe an energizing time correction based on a current pump pressure and the commanded dosing quantity.

Although many of the embodiments herein are describe in relation to volumetric pumps used for exhaust gas treatment systems, the embodiments herein are generally suitable for controlling volumetric pumps in other applications.

Other objects, advantages and novel features of the exemplary embodiments will become more apparent from the following detailed description of exemplary embodiments and the accompanying drawings.

DETAILED DESCRIPTION

Figure 1:
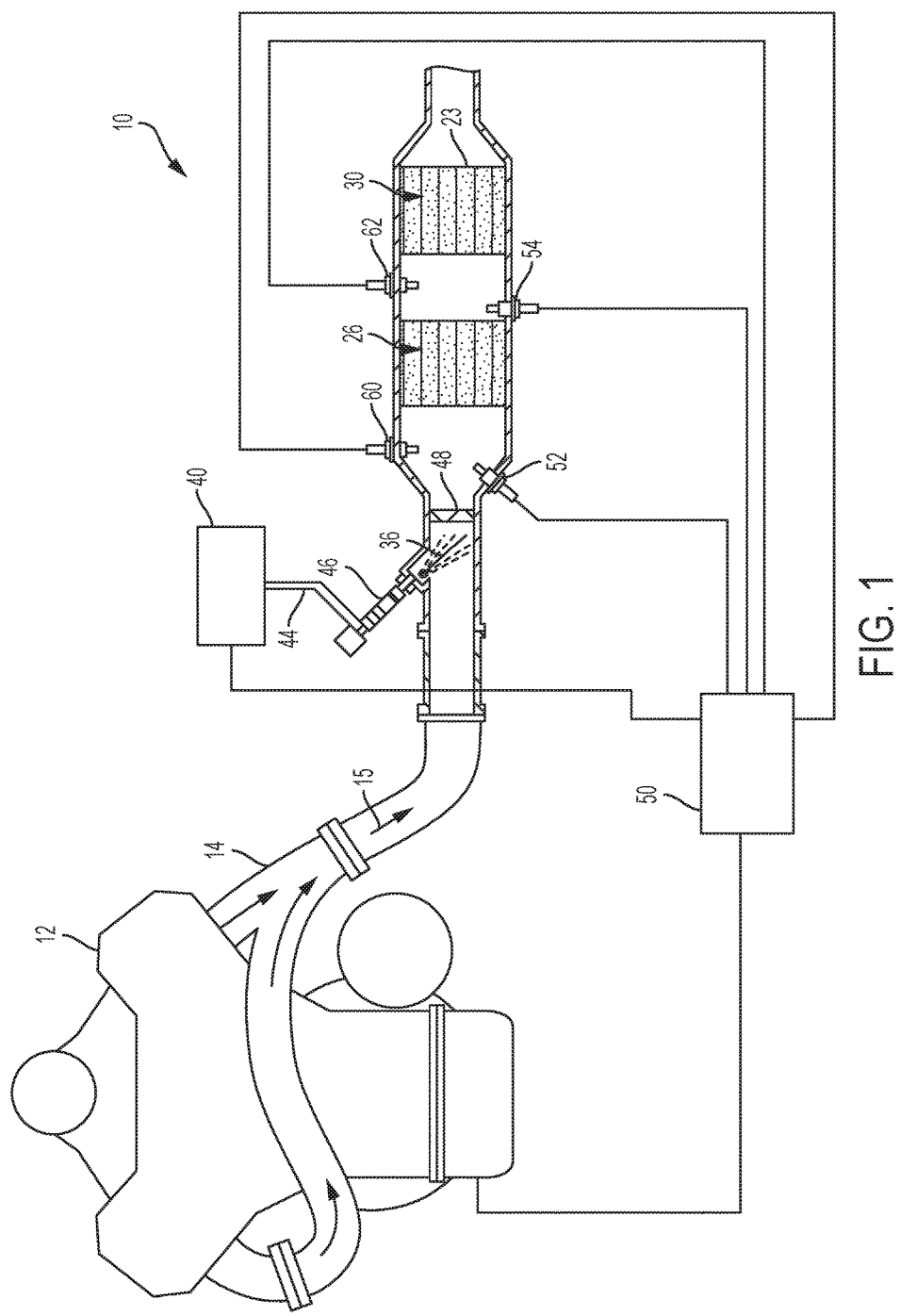
FIG. 1 shows a schematic for an exhaust gas treatment system, according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Selective catalytic reduction (SCR) devices are commonly utilized to treat exhaust gas for vehicles powered by ICEs, and rely on the delivery of reductant to the exhaust gas to effect treatment of the exhaust gas and proper catalytic operation of the SCR device. Volumetric pumps are often utilized to deliver a desired reductant dose to the exhaust gas treatment system, but pump logic and the operating characteristics of volumetric pumps often result in inaccurate dosing. The methods provided herein allow for any volumetric pump to be effectively utilized in an exhaust treatment system, such as system 10 described below, by reducing wasted reductant and $NH_3$ slip. Further, higher reductant dosing accuracy will allow SCR catalyst models (e.g., $NH_3$ storage, $NH_3$ slip reductant dosing adaptations) to perform more accurately.

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1A, an exemplary embodiment is directed to an exhaust gas treatment system 10, for the reduction of exhaust gas constituents of an exhaust gas source, ICE 12. The exhaust gas treatment system 10 described herein can be implemented in various engine systems that can include, but are not limited to, diesel engine systems, gasoline direct injection systems, and homogeneous charge compression ignition engine systems. The engines will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas stream 15 comprising $NO_x$ species, and the disclosure herein should accordingly be interpreted as applicable to all such devices. It should be further understood that the embodiments disclosed herein may be applicable to treatment of effluent streams not comprising $NO_x$ species, and, in such instances, ICE 12 can also generally represent any device capable of generating an effluent stream comprising not comprising $NO_x$ species.

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species. As used herein, "$NO_x$" refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$.

In the embodiment as illustrated, the exhaust gas treatment system 10 devices include a SCR device 26, and an optional particulate filter device (PF) device 30. The implementation shown provides the PF device 30 in a common housing with the SCR catalyst 124, yet this implementation is optional and implementations providing discrete housings for the SCR catalyst 124 and PF device 30 are suitable. Further, the PF device 30 can be disposed upstream of the SCR device 26 in many embodiments. As can be appreciated, the exhaust gas treatment system 10 of the present disclosure can include various combinations of one or more of the exhaust treatment devices shown in FIG. 1A, and/or other exhaust treatment devices (not shown), and is not limited to the present example. For example, the exhaust gas treatment system 10 can optionally include an oxidation catalyst (OC) device (not shown), a flow-through container of absorbent particles (not shown), an electrically heated catalyst (EHC) device (not shown), and combinations thereof. Exhaust gas treatment system 10 can further include a control module 50 operably connected via a number of sensors to monitor the engine 12 and/or the exhaust gas treatment system 10.

The SCR device 26 can be disposed downstream of the ICE 12. In some embodiments, the SCR device 26 can be disposed downstream of the optional EHC device, the optional flow-through container of absorbent particles, the optional OC device, and combinations thereof. In general, the SCR device 26 includes all devices which utilize a reductant 36 and a catalyst to convert NO and $NO_2$ to harmless components. The SCR device 26 can include, for example, a flow-through ceramic or metal monolith substrate that can be packaged in a stainless steel shell or canister having an inlet and an outlet in fluid communication with the exhaust gas conduit 14. The substrate can include a SCR catalyst composition applied thereto. The SCR device catalyst composition is generally a porous and high surface area material which can operate to convert $NO_x$ constituents in the exhaust gas 15 in the presence of a reductant 36, such as ammonia. For example, the catalyst composition can contain a zeolite and one or more base metal components such as iron (Fe), cobalt (Co), copper (Cu) or vanadium (V), sodium (Na), barium (Ba), titanium (Ti), tungsten (W), copper (Cu), and combinations thereof. In some embodiments the zeolite can be a β-type zeolite, a Y-type zeolite, a ZM5 zeolite, or any other crystalline zeolite structure such as a Chabazite or a USY (ultra-stable Y-type) zeolite. Suitable SCR catalyst compositions can have high thermal structural stability when used in tandem with PF device 30 which are regenerated via high temperature exhaust soot burning.

The SCR catalyst composition can be washcoated onto a substrate body that is housed within a canister that fluidly communicates with the exhaust gas conduit 14 and optionally other exhaust treatment devices. The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The PF device 30 can be disposed downstream of the SCR device 26, as shown, or can be disposed upstream of the SCR device 26. In some embodiments, exhaust treatment system 10 can include a selective catalytic reduction filter (SCRF) device. A SCRF device generally incorporates the aspects of both an SCR device and a PF device into a single device. In some embodiments, exhaust treatment system 10 can include a SCRF device as an alternative to a SCR device 26 and a PF device 30, or in addition to a SCR device 26 and a PF device 30. For the purposes of this disclosure, SCRF devices are to be considered a type of SCR device. Accordingly, the methods disclosed herein can be utilized for both SCR devices and. SCRF devices, individually or in combination.

FIG. 1 illustrates the control module 50 operably connected to the engine 12 and a reductant supply source 40. The control module 50 can further be operably connected to the optional exhaust treatment devices described above. As shown, the control module 50 can optionally be in communication with two temperature sensors 52 and 54 located in the exhaust gas conduit 14. The first temperature sensor 52 is located upstream of the SCR device 26, and the second temperature sensor 54 is located downstream of the SCR device 26. The temperature sensors 52 and 54 send electrical signals to the control module 50 that each indicate the temperature in the exhaust gas conduit 14 in specific locations. Also as shown, the control module 50 can optionally be in communication with two $NO_x$ sensors 60 and 62 that are in fluid communication with the exhaust gas conduit 14. Specifically, the first upstream $NO_x$ sensor 60 is located downstream of the ICE 12 and upstream of the SCR device 26 to detect a $NO_x$ concentration level. The second downstream $NO_x$ sensor 62 is located downstream of the SCR device 26 to detect the $NO_x$ concentration level in the exhaust gas conduit 14 in specific locations. In all such embodiments, the SCR device 26 can comprise a SCRF device 40.

The SCR device 26 generally uses a reductant 36 to reduce $NO_x$ species (e.g., NO and $NO_2$) to harmless components. Harmless components include one or more of species which are not $NO_x$ species, such as diatomic nitrogen, nitrogen-containing, inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, the reductant 36 can be any compound capable of decomposing or reacting in the presence of exhaust gas 15 to form ammonia. Equations (1)-(5) provide exemplary chemical reactions for $NO_x$ reduction involving ammonia.

$$6NO+4NH_3 \rightarrow 5N_2+6H_2O \quad (1)$$

$$4NO+4NH_3+O_2 \rightarrow 4N_2+6H_2O \quad (2)$$

$$6NO_2+8NH_3 \rightarrow 7N_2+12H_2O \quad (3)$$

$$2NO_2+4NH_3+O_2 43\ 3N_2+6H_2O \quad (4)$$

$$NO+NO_2+2NH_3 \rightarrow 2N_2+3H_2O \quad (5)$$

It should be appreciated that Equations (1)-(5) are merely illustrative, and are not meant to confine the SCR device 26 to a particular $NO_x$ reduction mechanism or mechanisms, nor preclude the operation of other mechanisms. The SCR device 26 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR device 26. Non-ammonia reductants can be used as a full or partial alternative to ammonia as desired. In implementations where the reductant 36 includes urea, the urea reacts with the exhaust to produce ammonia, and ammonia is supplied to the SCR device 26. The SCR device 26 can store (i.e., absorb, and/or adsorb) ammonia supplied by the reductant 36 for interaction with exhaust gas 15. Reaction (6) below provides an exemplary chemical reaction of ammonia production via urea decomposition.

$$CO(NH_2)_2+H_2O \rightarrow 2NH_3+CO_2 \quad (6)$$

It should be appreciated that Equation (6) is merely illustrative, and is not meant to confine the urea or other reductant 36 decomposition to a particular single mechanism, nor preclude the operation of other mechanisms.

A reductant 36 can be supplied from the reductant supply source 40 and injected into the exhaust gas conduit 14 at a location upstream of the SCR device 26 using an injector 46, or other suitable method of delivery of the reductant 36 to the exhaust gas 15. The reductant 36 can be in the form of a gas, a liquid, or an aqueous solution, such as an aqueous urea solution. The reductant 36 can be mixed with air in the injector 46 to aid in the dispersion of the injected spray. A mixer or turbulator 48 can also be disposed within the exhaust conduit 14 in close proximity to the injector 46 to further assist in thorough mixing of the reductant 36 with the exhaust gas 15 and/or even distribution throughout the SCR device 26.

The precise amount of injected mass of reductant 36 is important to maintain exhaust gas 15, and particularly $NO_x$ emissions, at an acceptable level. If too little reductant 36 is injected, $NO_x$ emissions may reach an unacceptable level. Conversely, injecting too much reductant 36 can be wasteful and lead to "ammonia slip", where ammonia passes through the SCR device 26 unreacted. A reductant 36 injection dosing quantity can be determined by one or more criteria such as $NO_x$ concentration upstream of a SCR device 26 (e.g., as measured by upstream $NO_x$ sensor 60), $NO_x$ concentration downstream of a SCR device 26 (e.g., as measured by downstream $NO_x$ sensor 62), downstream ammonia concentration, downstream temperature, torque output of engine 12, exhaust flow rate, exhaust pressure, engine 12 speed (e.g., rpm), engine 12 air intake rate, other suitable criteria, and combinations thereof. A reductant 36 dosing quantity can comprise a quantity (e.g., 1.2 mg), or a rate (e.g., 1.2 mg/s).

Figure 2A:
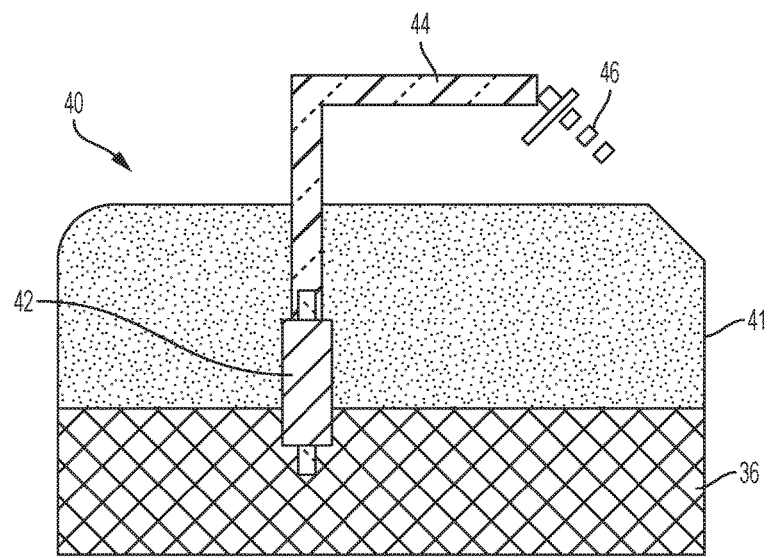
FIG. 2A illustrates a reductant supply source utilizing a volumetric pump, according to one or more embodiments.
Figure 2B:
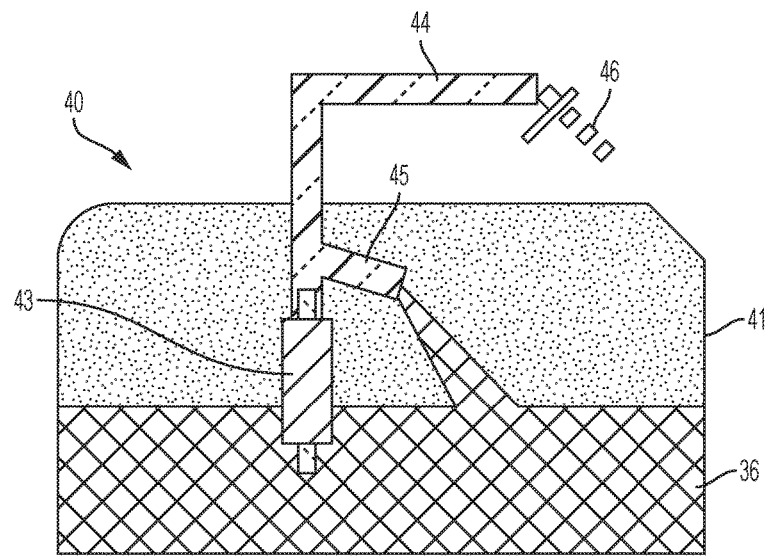
FIG. 2B illustrates a reductant supply source utilizing a continuous pump, according to one or more embodiments.

As illustrated in FIGS. 2A-B, a reductant supply source 40 can include a reservoir 41 suitable for storing reductant 36. A pump delivers reductant 36 via a supply line 44 to the injector 46 for injection into the exhaust treatment system 10. The pump can receive a dosing command from the module 50, for example, and deliver reductant 36 from the reservoir 41 to the injector 46. As shown in FIG. 2A, the pump comprises a volumetric pump 42 which pumps reductant 36 from reservoir 41 directly to injector 46 via supply line 44 without any relief or return lines. As shown in FIG. 2B, the pump comprises a continuous pump 43 which includes a return line 45 capable of diverting reductant in supply line 44 back to reservoir 41.

During operation of exhaust treatment system 10, module 50 can determine a reductant 36 injection dosing quantity via one or more of the criteria described above, and communicate the dosing quantity to the pump. The pump utilizes its particular pump logic to translate the module 50 dosing quantity command into an energizing time, and subsequently energizes and delivers reductant 36 to the exhaust treatment system for the determined about of time. For example, the pump logic can utilize criteria such as the prescribed dosing quantity, the battery or power source voltage, and current pump pressure in order to determine the energizing time.

Volumetric pump 42 can operate in one mode to deliver fluid to supply line 44 and in a second mode to remove fluid from supply line 44, for example. Volumetric pump 42 generally operates by energizing (i.e., pumping fluid) to achieve an operating pressure (for example, a maximum operating pressure), and subsequently deenergizing. When fluid flow through the pump output line (e.g., injector 46) or parasitic pressure losses reduce the line pressure, volumetric pump 42 will reenergize. Accordingly, the operating pressure profile of volumetric pump 42 is represented by repeating energizing events comprising a steep or immediate increase in pressure followed by a subsequent decline in pressure. This pressure profile can lead to inaccurate reductant 36 injection. On the other hand, continuous pump 43 is capable of maintaining a constant pressure within supply line 44, regardless of fluid flow through the pump output line (e.g., injector 46) or parasitic pressure losses, due to the return line 45. Further, volumetric pump 42 may be paired with an injector 46 or supply line 44 which further exacerbate reductant 36 injection inaccuracy.

Figure 3:
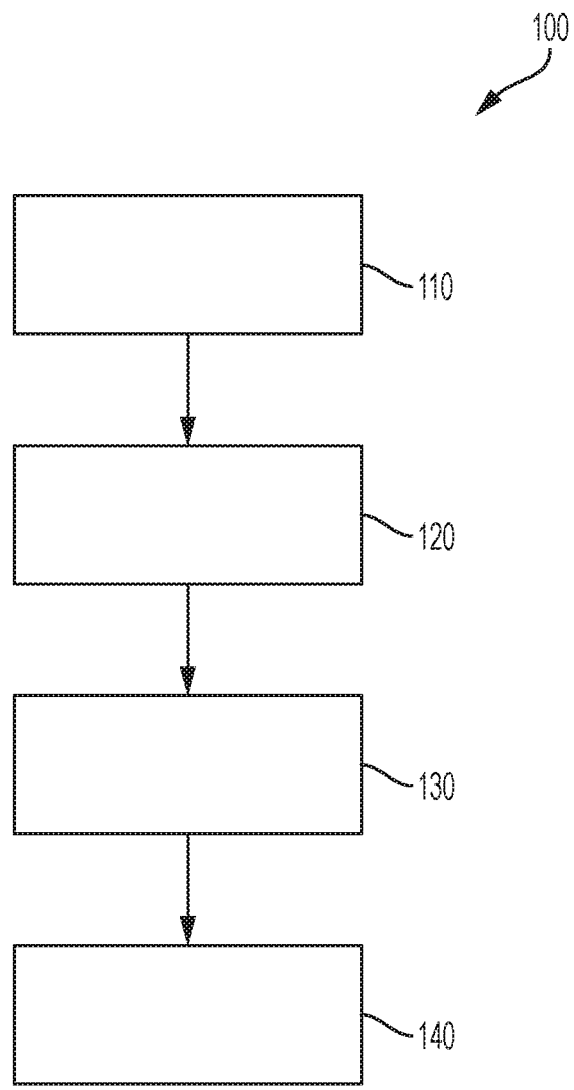
FIG. 3 illustrates a method for correcting volumetric pump energizing times, according to one or more embodiments.

In many exhaust gas treatment systems, the reductant supply source comprises a volumetric pump, and there is a need for more accurate control of such pumps. Accordingly, a method for correcting volumetric pump 42 dosing accuracy is provided. FIG. 3 illustrates a method 100 for correcting volumetric pump energizing times which comprises commanding 110 a reductant 36 dosing quantity, determining 120 a volumetric pump energizing time using pump logic, determining 130 an energizing time correction, and energizing 140 the pump. Method 100 is suitable for application in any system utilizing a SCR device, such as exhaust treatment system 10. Commanding 110 a reductant dose can include determining a reductant dose using various operating criteria. A non-limiting list of operating criteria can include one or more of an exhaust gas stream $NO_x$ concentration upstream of a SCR device 26, an exhaust gas stream $NO_x$ concentration downstream of a SCR device 26, ammonia concentration downstream of a SCR device, temperature downstream of a SCR device, torque output of an engine providing exhaust gas for treatment in a SCR, exhaust gas flow rate, exhaust gas pressure, engine speed (e.g., rpm), and engine air intake rate. A control module, such as module 50, can determine the reductant dose. Commanding 110 a reductant dose can include transmitting the determined reductant dose to a reductant supply system including a volumetric pump. A control module, such as module 50, can transmit the determined reductant dose to the volumetric pump.

A volumetric pump energizing time is determined 120 using pump logic particular to the volumetric pump. In some embodiments the pump logic accompanies a pump as supplied to a vehicle manufacturer, for example. In such instances, and in many others, the pump logic cannot be manipulated or altered. The pump logic can be configured to receive a reductant dosing quantity command, for example a dosing quantity command from a module, and convert the command to an energizing time. The energizing time can be determined based on factors such as the commanded 110 reductant dosing quantity, the voltage of the battery or power supply powering the pump, the current pump pressure, and combinations thereof. It is practicable that the logic may rely on additional or alternative factors.

Determining 130 an energizing time correction comprises rectifying the discrepancy between the reductant quantity delivered to the exhaust system by the pump as energized for the determined 120 energizing time, and the reductant dosing quantity commanded 110. In some embodiments, the energizing correction comprises increasing the determined 120 energizing time (i.e., a positive energizing time correction). Determining 130 an energizing time correction can be accomplished theoretically and/or empirically. In some embodiments, the energizing time correction can be determined 130 using a calibration table. For example, Table 1 provides a calibration table that prescribes an energizing time correction (in seconds) for a given pump pressure (in barr) and the commanded reductant dosing quantity:

TABLE 1

Pump Energizing Time Correction Calibration Table:

| | | Desired Dosing Rate (mg/s) | | | | |
|---|---|---|---|---|---|---|
| | | 12 | 20 | 40 | 80 | 120 |
| Pressure | 5.5 | 4 | 6 | 8 | 16 | 24 |
| (Barr) | 5.25 | 6 | 9 | 12 | 24 | 36 |
| | 5 | 8 | 12 | 16 | 32 | 48 |
| | 4.75 | 10 | 15 | 20 | 40 | 60 |
| | 4.5 | 0 | 0 | 0 | 0 | 0 |

A calibration table can utilize commanded 110 reductant dosing quantities to determine 130 an energizing time correction. A calibration table can utilize exhaust gas flow (e.g., volumetric flow, and/or mass flow) to determine 130 an energizing time correction. A calibration table can utilize other criteria to determine 130 an energizing time correction, including one or more of an exhaust gas stream $NO_x$ concentration upstream of a SCR device 26, an exhaust gas stream $NO_x$ concentration downstream of a SCR device 26, an ammonia concentration downstream of a SCR device, temperature downstream of a SCR device, torque output of an engine providing exhaust gas for treatment in a SCR, exhaust gas flow rate, exhaust gas pressure, engine speed (e.g., rpm), and engine air intake rate.

Energizing 140 the volumetric pump can comprise modifying the determined 120 energizing time with the determined 130 energizing time correction. For example, energizing 140 the volumetric pump can comprise adding an energizing time correction determined 130 from a calibration table to the energizing time 120 determined by the volumetric pump logic. Energizing 140 then further comprises energizing 140 the volumetric pump for a duration equal to the modified energizing time. Such a method allows for volumetric pumps, such as volumetric pump 42, and other exhaust treatment system components, such as injector 46, to be utilized in cooperation, regardless of deficiencies in initial calibration deficiencies. A calibration table determined empirically for a specific volumetric pump can provide accurate reductant dosing, particularly considering that dosing discrepancies between the reductant quantity delivered to the exhaust system by the volumetric pump as energized for the determined 120 energizing time and the reductant dosing quantity commanded 110 are typically non-linear.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an exhaust gas treatment system including an exhaust gas stream supplied by an exhaust gas source to a selective catalytic reduction (SCR) device, and a reductant supply source utilizing a volumetric pump, the method comprising: commanding a reductant dosing quantity, determining a volumetric pump energizing time, determining an energizing time correction, modifying the determined energizing time with the energizing time correction to determine a modified energizing time, and energizing the pump for a duration equal to the modified energizing time.

2. The method of claim 1, wherein commanding a reductant dose includes determining a reductant dose using one or more of an exhaust gas stream $NO_x$ concentration upstream of the SCR device, an exhaust gas stream $NO_x$ concentration downstream of the SCR device, an ammonia concentration downstream of the SCR device, a temperature downstream of a SCR device, an exhaust gas flow rate, an exhaust gas pressure.

3. The method of claim 1, wherein the exhaust gas source comprises an internal combustion engine, and commanding a reductant dose includes determining a reductant dose using one or more of a torque output of the internal combustion engine, a rotations per minute speed of the internal combustion engine, and an internal combustion engine air intake.

4. The method of claim 1, wherein the volumetric pump comprises pump logic, and the volumetric pump energizing time is determined by the pump logic.

5. The method of claim 1, wherein the volumetric pump energizing time is determined based on one or more of the commanded reductant dosing quantity, a voltage of a battery or a power supply powering the volumetric pump, and a current pump pressure.

6. The method of claim 1, wherein determining an energizing correction comprises increasing the determined energizing time.

7. The method of claim 1, wherein the energizing time correction is determined using a calibration table.

8. The method of claim 7, wherein the calibration table prescribes an energizing time correction based on a current pump pressure and the commanded dosing quantity.

9. The method of claim 7, wherein the calibration table prescribes an energizing time correction based on the commanded dosing quantity.

10. The method of claim 7, wherein the calibration table prescribes an energizing time correction based on current exhaust gas flow.

11. The method of claim 7, wherein the calibration table prescribes an energizing time correction based on one or more of an exhaust gas stream $NO_x$ concentration upstream of the SCR device, an exhaust gas stream $NO_x$ concentration downstream of the SCR device, an ammonia concentration downstream of the SCR device, a temperature downstream of a SCR device, an exhaust gas flow rate, and an exhaust gas pressure.

12. The method of claim 7, wherein the exhaust gas source comprises an internal combustion engine, the calibration table prescribes an energizing time correction based on one or more of a torque output of the internal combustion engine, a rotations per minute speed of the internal combustion engine, and an internal combustion engine air intake.

13. The method of claim 1, wherein the commanded reductant dosing quantity comprises a mass of reductant.

14. The method of claim 1, wherein the commanded reductant dosing quantity comprises a rate of mass of reductant per a unit time.

15. The method of claim 1, wherein the SCR device comprises a catalyst capable of reducing $NO_x$ constituents in the exhaust gas steam.

16. The method of claim 1, wherein the reductant comprises anhydrous ammonia, aqueous ammonia, urea, and combinations thereof.

17. The method of claim 1, wherein the exhaust gas stream comprises one or more $NO_x$ species.

18. The method of claim 1, wherein the SCR device comprises a selective catalytic reduction filter device.

19. A method for controlling an exhaust gas treatment system including an exhaust gas stream supplied by an exhaust gas source to a selective catalytic reduction (SCR) device, and a reductant supply source utilizing a volumetric pump, the method comprising: commanding a reductant dosing quantity, determining a volumetric pump energizing time, determining an energizing time correction, modifying the determined energizing time with the energizing time correction to determine a modified energizing time, and energizing the pump for a duration equal to the modified energizing time, wherein the energizing time correction is determined using a calibration table which prescribes an energizing time correction based on one or more of an exhaust gas stream $NO_x$ concentration upstream of the SCR device, an exhaust gas stream $NO_x$ concentration downstream of the SCR device, an ammonia concentration downstream of the SCR device, a temperature downstream of a SCR device, an exhaust gas flow rate, and an exhaust gas pressure.

* * * * *